(12) United States Patent
Kang et al.

(10) Patent No.: US 10,095,941 B2
(45) Date of Patent: Oct. 9, 2018

(54) VISION RECOGNITION APPARATUS AND METHOD

(71) Applicant: Samsung Electronics Co., Ltd., Gyeonggi-do (KR)

(72) Inventors: Hwa-Yong Kang, Gyeonggi-do (KR); Young-Kwon Yoon, Seoul (KR); Young-Sam Yu, Gyeonggi-do (KR); Eun-Soo Chang, Seoul (KR)

(73) Assignee: Samsung Electronics Co., Ltd (KR)

( * ) Notice: Subject to any disclaimer, the term of this patent is extended or adjusted under 35 U.S.C. 154(b) by 158 days.

(21) Appl. No.: 13/662,642

(22) Filed: Oct. 29, 2012

(65) Prior Publication Data

US 2013/0108107 A1    May 2, 2013

(30) Foreign Application Priority Data

Oct. 27, 2011 (KR) ................. 10-2011-0110585

(51) Int. Cl.
*G06K 9/20* (2006.01)
*G06T 3/40* (2006.01)
(Continued)

(52) U.S. Cl.
CPC ......... *G06K 9/209* (2013.01); *H04N 5/23241* (2013.01); *H04N 5/343* (2013.01);
(Continued)

(58) Field of Classification Search
CPC .. H04N 9/045; H04N 7/012; H04N 2209/046; H04N 5/2176; H04N 21/4223;
(Continued)

(56) References Cited

U.S. PATENT DOCUMENTS 7,432,958 B2    10/2008  Hanada et al.
2004/0135910 A1  7/2004  Nam
(Continued)

FOREIGN PATENT DOCUMENTS

CN    102057347    5/2011
CN    102196164    9/2011
(Continued)

OTHER PUBLICATIONS

Chinese Office Action dated Sep. 14, 2015 issued in counterpart application No. 201210419838.5, 17 pages.
(Continued)

*Primary Examiner* — Kenny Cese
(74) *Attorney, Agent, or Firm* — The Farrell Law Firm, P.C.

(57) ABSTRACT

Some of pixels in a general image sensor for image capturing are designated as vision pixels used for vision recognition. Optical information obtained only from the vision pixels is used to perform vision recognition in the vision recognition mode. Capturing image data is generated based on optical information obtained from all the pixels in the image data in the image-shooting mode. A digital signal converter that converts optical information obtained only from vision pixels into a digital signal is separately provided in addition to a digital signal converter that converts optical information of all pixels in the image sensor into a digital signal.

15 Claims, 7 Drawing Sheets

(51) Int. Cl.
  *H04N 5/232* (2006.01)
  *H04N 5/343* (2011.01)
  *H04N 5/378* (2011.01)
  *H04N 9/04* (2006.01)
  *H04N 5/369* (2011.01)

(52) U.S. Cl.
  CPC ........... *H04N 5/3696* (2013.01); *H04N 5/378* (2013.01); *H04N 9/045* (2013.01); *G06T 3/4007* (2013.01); *G06T 2207/10024* (2013.01); *H04N 5/23216* (2013.01)

(58) Field of Classification Search
  CPC .... H04N 5/357; H04N 5/23241; H04N 5/343; H04N 5/378; H04N 5/23216; H04N 5/3696; G06T 3/4015; G06T 1/0007; G06T 5/008; G06T 3/4007; G06T 3/403; G06T 5/001; G06T 2207/10024; H01L 27/14625; H01L 27/14621; G06K 9/209
  USPC .......................................... 382/300, 302, 303
  See application file for complete search history.

(56) References Cited

U.S. PATENT DOCUMENTS

| | | | | |
|---|---|---|---|---|
| 2007/0201738 A1* | 8/2007 | Toda | ...................... | H04N 9/045 382/144 |
| 2007/0211153 A1* | 9/2007 | Uchida | .............. | H04N 5/23293 348/231.99 |
| 2008/0117314 A1 | 5/2008 | Kim et al. | | |
| 2008/0122961 A1 | 5/2008 | Park et al. | | |
| 2008/0124000 A1* | 5/2008 | Sato | ........................ | H04N 9/045 382/300 |
| 2009/0174789 A1* | 7/2009 | Takeshita | ............... | H04N 5/145 348/222.1 |
| 2009/0180012 A1* | 7/2009 | Ino | ................................ | 348/300 |
| 2010/0188520 A1 | 7/2010 | In et al. | | |
| 2010/0245614 A1 | 9/2010 | Matsunaga | | |
| 2010/0315539 A1* | 12/2010 | Azuma | .............. | H04N 5/23232 348/265 |
| 2011/0141009 A1 | 6/2011 | Izumi | | |
| 2011/0221914 A1 | 9/2011 | Shinbo et al. | | |
| 2012/0081580 A1* | 4/2012 | Cote | ........................ | H04N 5/335 348/231.99 |

FOREIGN PATENT DOCUMENTS

| | | |
|---|---|---|
| EP | 2 237 551 | 10/2010 |
| JP | 3674413 | 7/2005 |
| JP | 2007134805 | 5/2007 |
| JP | 2009-272820 | 11/2009 |
| KR | 1020100109502 | 10/2010 |
| WO | WO 2008/107713 | 9/2008 |

OTHER PUBLICATIONS

Korean Office Action dated Apr. 14, 2017 issued in counterpart application No. 10-2011-0110585, 20 pages.

* cited by examiner

VISION RECOGNITION APPARATUS AND METHOD

PRIORITY

This application claims priority under 35 U.S.C. § 119(a) to a Korean Patent Application filed in the Korean Intellectual Property Office on Oct. 27, 2011 and assigned Serial No. 10-2011-0110585, the contents of which are incorporated herein by reference.

BACKGROUND OF THE INVENTION

1. Field of the Invention

The present invention relates generally to vision recognition, and more particularly, to an image generation apparatus and method for performing image processing for vision recognition with low power consumption.

2. Description of the Related Art

Due to the miniaturization of digital cameras and the development of image processing technology, a variety of digital devices have an image capturing function. For example, a digital camera is included in digital devices such as mobile phones, handheld televisions, portable personal computers, notebook computers, digital audio players and Portable Multimedia Players (PMPs), thereby enabling image capturing. The digital devices may operate in a preview mode, a still image-shooting mode, or a video-shooting mode, to enable image capturing.

A digital camera in a digital device may be used for image capturing, and also for a vision recognition function for inputting information. In other words, digital devices may extract image information from still images, preview images and videos captured by their digital camera, and use the extracted image information as User-Machine Interface (UMI) data.

Figure 1:
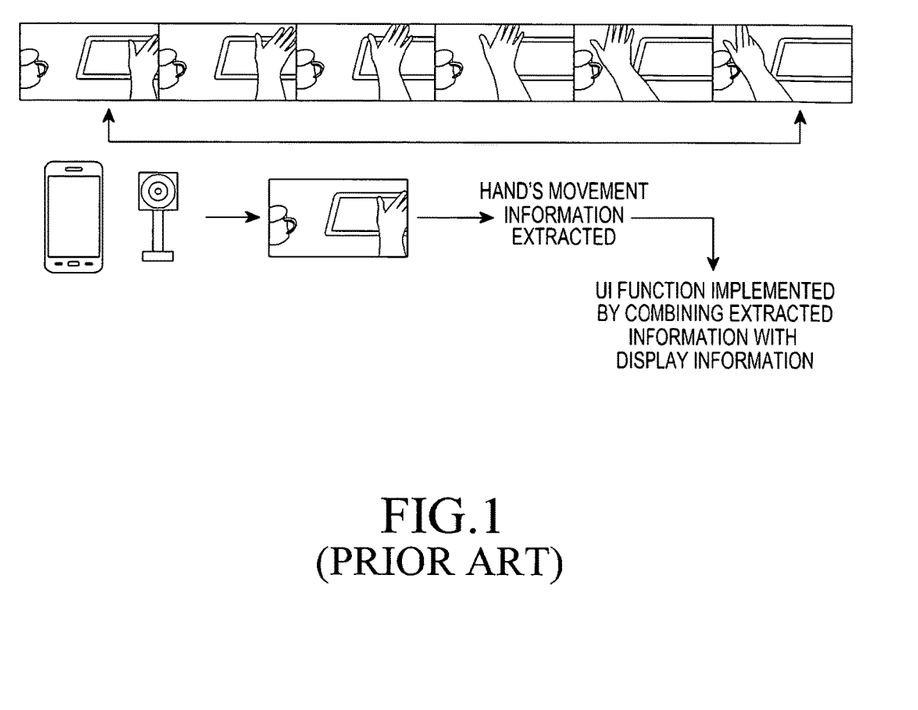
FIG. 1 illustrates conventional vision recognition.

FIG. 1 illustrates vision recognition, in which a screen of a notebook computer moves depending on the movement of a user's hand.

Referring to FIG. 1, the notebook computer extracts the movement of a user's hand from preview images, and changes data displayed on its screen depending on the movement of the user's hand by combining the extracted movement of a user's hand with display information.

The digital devices consume a substantial amount of power because they should extract information for vision recognition from images captured in a preview mode, a still image-shooting mode and a video-shooting mode of the digital camera. Because of the substantial power consumption, the application of vision recognition technology may be compromised to portable digital devices as a user interface.

In addition, the digital devices should extract information for vision recognition from optical information of many more image pixels than necessary since they use captured images for vision recognition, causing an increase in computation time and power consumption. To compensate for these shortcomings, the amount of information obtained from image pixels may be reduced. In this case, however, unnecessary operations may be undesirably added. Because of the long time required to output information about many image pixels, this method may not be applied to user interfaces that require a very fast response speed.

Moreover, digital devices use optical power which is filtered to about ⅓ or less by a color filter because they use an image sensor for image capturing, which causes a deterioration of the low-light performance.

SUMMARY OF THE INVENTION

An aspect of an embodiment of the present invention is to provide an apparatus and method capable of performing image capturing and vision recognition with low power consumption by using one image sensor.

Another aspect of an embodiment of the present invention is to provide an apparatus and method for enabling vision recognition computation at high speed by providing an image sensor that is optimized for vision recognition and also enables normal image capturing.

In accordance with an aspect of the present invention, there is provided a vision recognition apparatus in a digital device, including an image sensor in which some of the pixels are designated as vision pixels, a first digital signal converter for converting a signal output from each of the vision pixels into a digital signal, a second digital signal converter for converting a signal output from each of all the pixels into a digital signal, and an integrated image processor for generating recognition image data used for vision recognition by processing signals output from the first digital signal converter in a vision recognition mode, and generating capturing image data by processing signals output from the second digital signal converter in a shooting mode.

In accordance with an aspect of the present invention, there is provided a vision recognition method in a digital device with an image sensor, including determining whether an operation mode is a vision recognition mode, if the operation mode is a vision recognition mode, generating recognition image data by processing signals output from a first digital signal converter that converts a signal output from each of vision pixels including some of the pixels in the image sensor, into a digital signal, performing vision recognition by identifying and detecting a specific object included in the recognition image data; and if the operation mode is a shooting mode, generating capturing image data by processing signals output from pixels selected from among all the pixels depending on a specific resolution, by a second digital signal converter that converts a signal output from each of all the pixels into a digital signal.

In accordance with an aspect of the present invention, there is provided a low-power vision recognition method in a mobile terminal with an image sensor, including receiving an image from the image sensor, extracting a recognition image input to vision pixels including some of the pixels in the image sensor, and performing vision recognition on an object included in the recognition image input to the vision pixels.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Embodiments of the present invention will now be described in detail with reference to the accompanying drawings. In the following description, specific details such as detailed configuration and components are merely provided to assist the overall understanding of embodiments of the present invention. Therefore, it should be apparent to those skilled in the art that various changes and modifications of the embodiments described herein can be made without departing from the scope and spirit of the invention. In addition, descriptions of well-known functions and constructions are omitted for the sake of clarity and conciseness.

According to an embodiment of the present invention, using a digital camera in or connected to a digital device such as a mobile phone, a handheld television, a portable personal computer, a notebook computer, a digital audio player and a PMP, a digital device may extract vision recognition information from images captured by the digital camera, and perform functions such as information inputting and situation recognition between its user and the digital device based on the extracted information. In particular, an embodiment of the present invention provides an image sensor that is optimized for vision recognition and enables normal image capturing at high performance, enabling optimized vision recognition with low power consumption.

More specifically, some pixels in a general image sensor for image capturing are designated as vision pixels used for vision recognition. In a vision recognition mode, optical information obtained only from the vision pixels are used for vision recognition. In an image-shooting mode, image data is generated using optical information that is obtained from all pixels in the image sensor, or from the pixels that are selected depending on a resolution of images. The number of pixels designated as vision pixels may be greater than or equal to the minimum number of pixels for normal vision recognition.

In addition to a digital signal converter that converts optical information of all pixels in the image sensor into a digital signal, the present invention may separately provide a digital signal converter that converts optical information obtained only from vision pixels into a digital signal. Moreover, the present invention may separately provide an image processor for processing signals output from the digital signal converter for vision recognition and an image processor for processing signals output from the digital converter for image capturing.

The number of output bits of the digital signal converter for vision recognition, and a resolution of and the number of frames of image data for vision recognition are determined to be optimized for vision recognition, enabling a rapid performance of vision recognition with low power consumption, compared to processing image data for image capturing.

More specifically, a mobile terminal having an image sensor according to an embodiment of the present invention receives image data using the image sensor, extracts recognition image data input to vision pixels including some of the pixels in the image sensor, and performs vision recognition on an object included in the recognition image data input to the vision pixels.

For the sake of conciseness, image data related to general photos, videos and preview images will be referred to herein as 'capturing image data', and image data generated for vision recognition or used in vision recognition will be referred to as 'recognition image data'.

Figure 2:
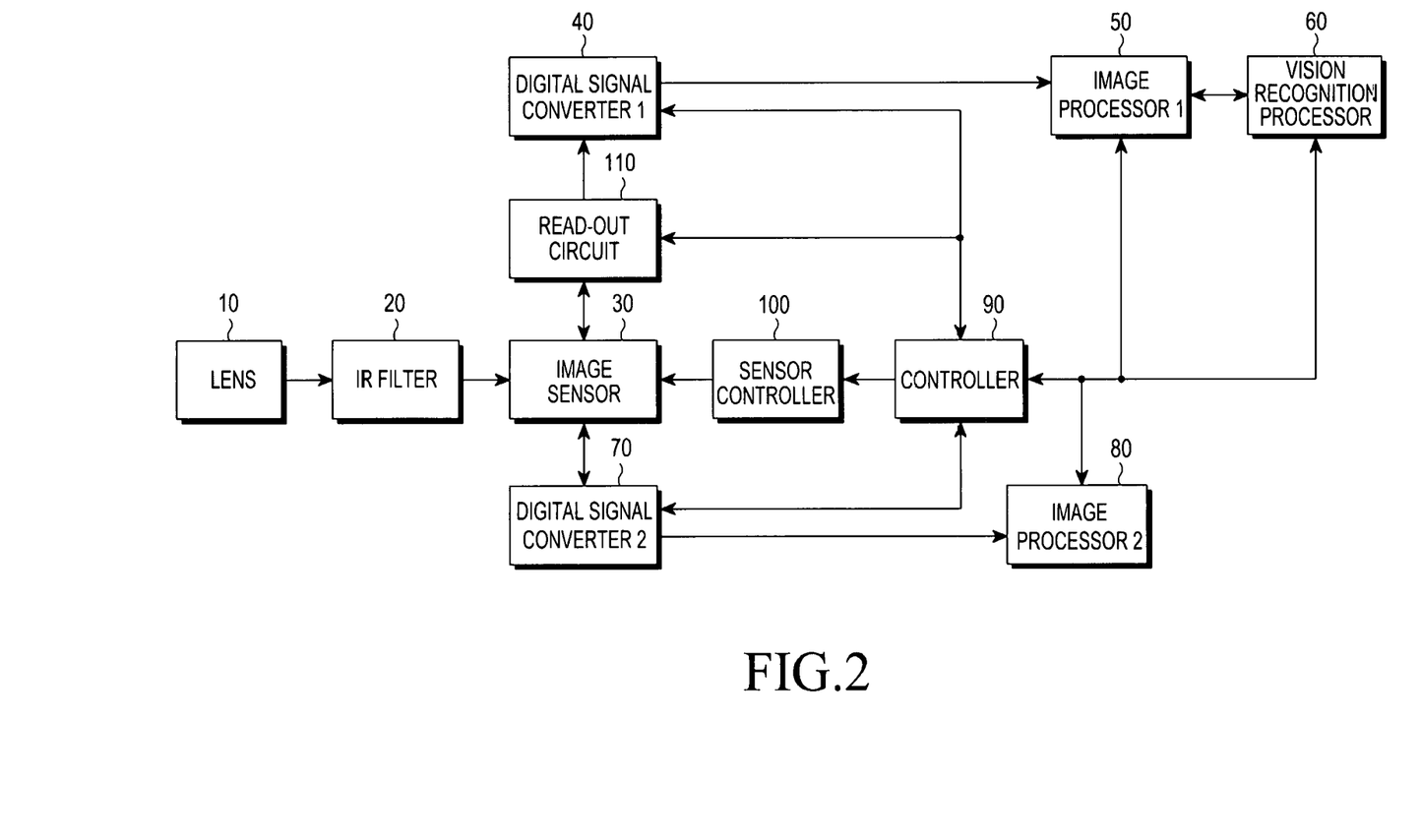
FIG. 2 illustrates a digital device according to an embodiment of the present invention.

FIG. 2 illustrates a digital device according to an embodiment of the present invention. Referring to FIG. 2, the digital device includes a lens 10, an Infrared Ray (IR) filter 20, an image sensor 30, a first digital signal converter 40, a second digital signal converter 70, a controller 90, a first image processor 50, a second image processor 80, a vision recognition processor 60, a sensor controller 100, and a read-out circuit 110, and may further include a memory and a display although they are not illustrated. This digital device may be, for example, a mobile phone, a handheld television, portable personal computer, a notebook computer, a digital audio player, or a PMP.

The read-out circuit 110, the first digital signal converter 40, the first image processor 50, and the vision recognition processor 60 constitute a component section for generating recognition image data and performing vision recognition based on the recognition image data. The second digital signal converter 70 and the second image processor 80 constitute a component section for generating capturing image data.

The IR filter 20 blocks or filters infrared rays from light received through the lens 10. The controller 90 controls the overall operation of the digital device. For example, the controller 90 sets any one of operation modes in the digital device, such as a shooting mode and a vision recognition mode. Depending on the set operation mode, the controller 90 controls operations of the sensor controller 100, the image sensor 30, the first digital signal converter 40, the second digital signal converter 70, the first image processor 50, the second image processor 80, and the vision recognition processor 60.

The shooting mode, an operation mode for generating conventional still images such as snapshots, or generating videos using the above components, may be subdivided into a still image-shooting mode, a preview mode, and a video-shooting mode.

The vision recognition mode is for detecting and recognizing a specific object or movement of the specific object from the generated recognition image data, and performing a specific operation depending on the recognition results. Functions based on the vision recognition mode may include, for example, a vision recognition user interface, augmented reality, face recognition, gesture recognition, and a screen change detection user interface. In operation, for example, in the vision recognition mode, the digital device may detect movement of a user's hand from a recognition image data and execute a specific command corresponding to the detected movement of the user's hand. Otherwise, the digital device may perform user authentication by performing face recognition based on recognition image data obtained by taking a picture of a user's face.

The sensor controller 100, under operation mode-specific control of the controller 90, changes the settings of operation parameters of the image sensor 30, and controls related image sensor pixels. The operation parameters are, for example, values for determining a resolution, an exposure time, a gain, and a frame rate of image data generated by actual image capturing.

In the shooting mode, if values of various operation parameters are determined to generate snapshot data, preview image data, or video data having a specific size and resolution, the sensor controller 100 sets the operation parameters having the determined values in the image sensor 30. The sensor controller 100 may select and activate image sensor pixels to be used in the image sensor 30 depending on the determined resolution.

The controller 90 controls the second digital signal converter 70 and the second image processor 80 to generate capturing image data.

In the vision recognition mode, values of the operation parameters are determined depending on the format of recognition image data, which is specific to vision recognition processing. In other words, values of operation parameters are determined depending on the resolution and the frame rate of recognition image data, which should be secured during vision recognition processing. The sensor controller 100 sets the operation parameters in the image sensor 30 to have the values determined in the vision recognition mode. The sensor controller 100 activates vision pixels in the image sensor 30. In this case, the sensor controller 100 operates in a low-power mode.

Herein, a sensor controller 100 is provided to selectively operate in the shooting mode or the vision recognition mode. Alternatively, however, the digital device may include a first sensor controller for controlling the image sensor 30 in the vision recognition mode, and a second sensor controller for controlling the images sensor 30 in the shooting mode. In this case, the first sensor controller is implemented to operate with lower power consumption compared to the second sensor controller, because the first sensor controller controls only the vision pixels.

The controller 90 controls the read-out circuit 110, the first digital signal converter 40, and the first image processor 50 to generate recognition image data.

The image sensor 30 is a device in which if light is input to an optical conductor through a color filter, electrons and holes occurring in the optical conductor vary depending on the wavelength and intensity of the light, and the device outputs the variation in electrons and holes as a voltage signal in a level enabling signal processing. Image sensors are generally classified into a Charge-Coupled Device (CCD) image sensor and a Complementary Metal-Oxide Semiconductor (CMOS) image sensor according to their type.

Figure 4:
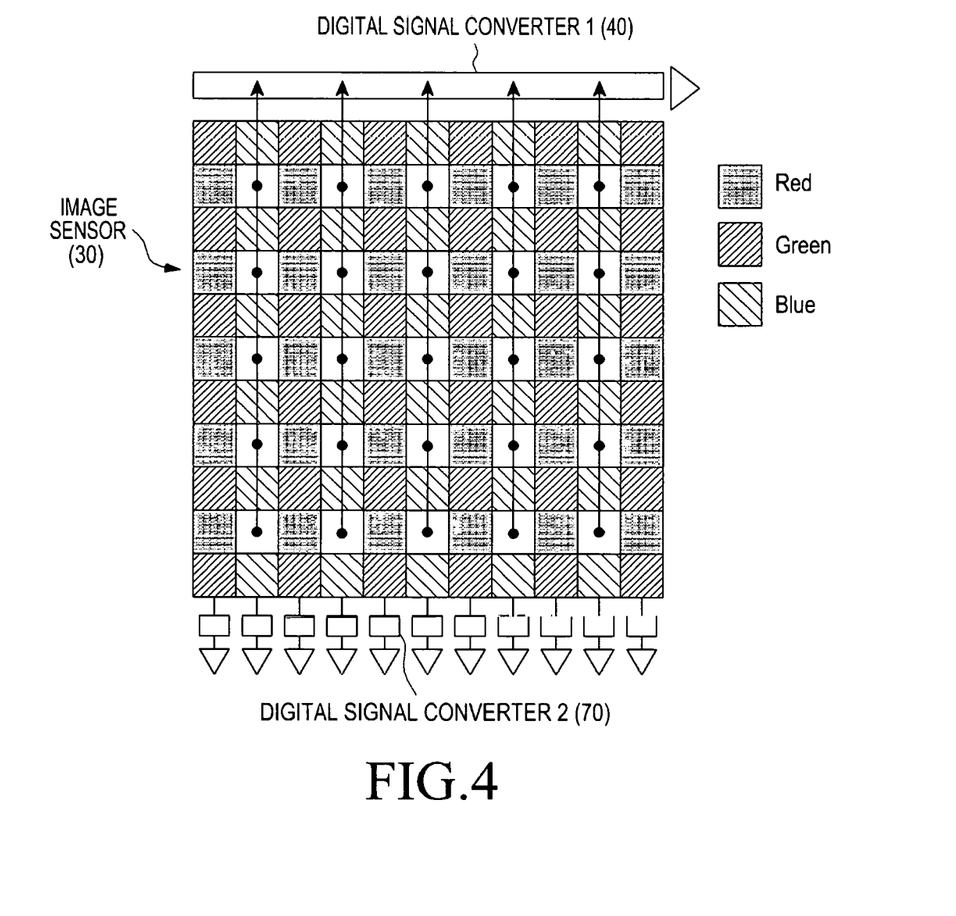
FIG. 4 illustrates an image sensor according to an embodiment of the present invention.

The image sensor 30 includes unit pixels, and may be constituted by an image sensor array in which a plurality of image sensor pixels are arranged in columns and rows to obtain standardized images. The image sensor 30 includes a color filter in a Bayer pattern that implements the light received through the lens 10 in the original full color, and the image sensor 30 shown in FIG. 4 is a top view thereof. The Bayer pattern has been a highly important principle of digital images since it was disclosed in the 1970s. This principle is founded on the fact that the actual images existing in nature do not include dots (or pixels), whereas digital images must be implemented with dots. To make images consisting of dots by gathering the brightness and color of the target images, filters for receiving the brightness of each of Red (R), Green (G) and Blue (B) (hereinafter R,G and B) colors are arranged on a two-dimensional plane, which is called the Bayer pattern. Pixels forming a grid network under the Bayer pattern color filters recognize only their assigned color among the R,G and B colors rather than recognizing the full color, and then deduce the full color by interpolating the recognized colors.

Signals output from a plurality of pixels constituting the image sensor 30 may be input to the second digital signal converter 70. Analog signals including optical information, which are input to the second digital signal converter 70, are converted into digital signals, and are output to the second image processor 80 which performs signal processing for generating capturing image data.

Some of the plurality of pixels are designated as vision pixels according to an embodiment of the present invention. The vision pixels are pixels used to generate image data used for vision recognition, and signals output from the vision pixels may be output to the second digital signal converter 70, and may also be input to the first digital signal converter 40 through the read-out circuit 110. The number of pixels designated as vision pixels may be greater than or equal to the minimum number of pixels that can generate recognition image data for normal vision recognition.

The read-out circuit 110 is connected to each of the vision pixels so that output signals of the vision pixels may be input to the first digital signal converter 40.

Any of the plurality of pixels constituting the image sensor 30 may be used as vision pixels. Recognition image data used in vision recognition does not need to be represented in the original full color because it is aimed to detect and recognize a specific object included in the image data. The recognition image data may be generated to facilitate detection and recognition of an object. Accordingly, it is more efficient for the vision pixels to be configured to have high-sensitivity characteristics even at a low luminance.

For example, the vision pixels may include only green pixels having higher-sensitivity characteristics among the pixels receiving brightness of the R,G and B colors.

As another example, the vision pixels may include high-sensitivity white pixels, which may be implemented by removing color filters thereof from the Bayer pattern. In this case, pixel interpolation is performed to prevent optical information obtained from white pixels from serving as defects during generation of capturing image data, so optical information obtained from the vision pixels may be used even in the capturing image data.

Figure 6:
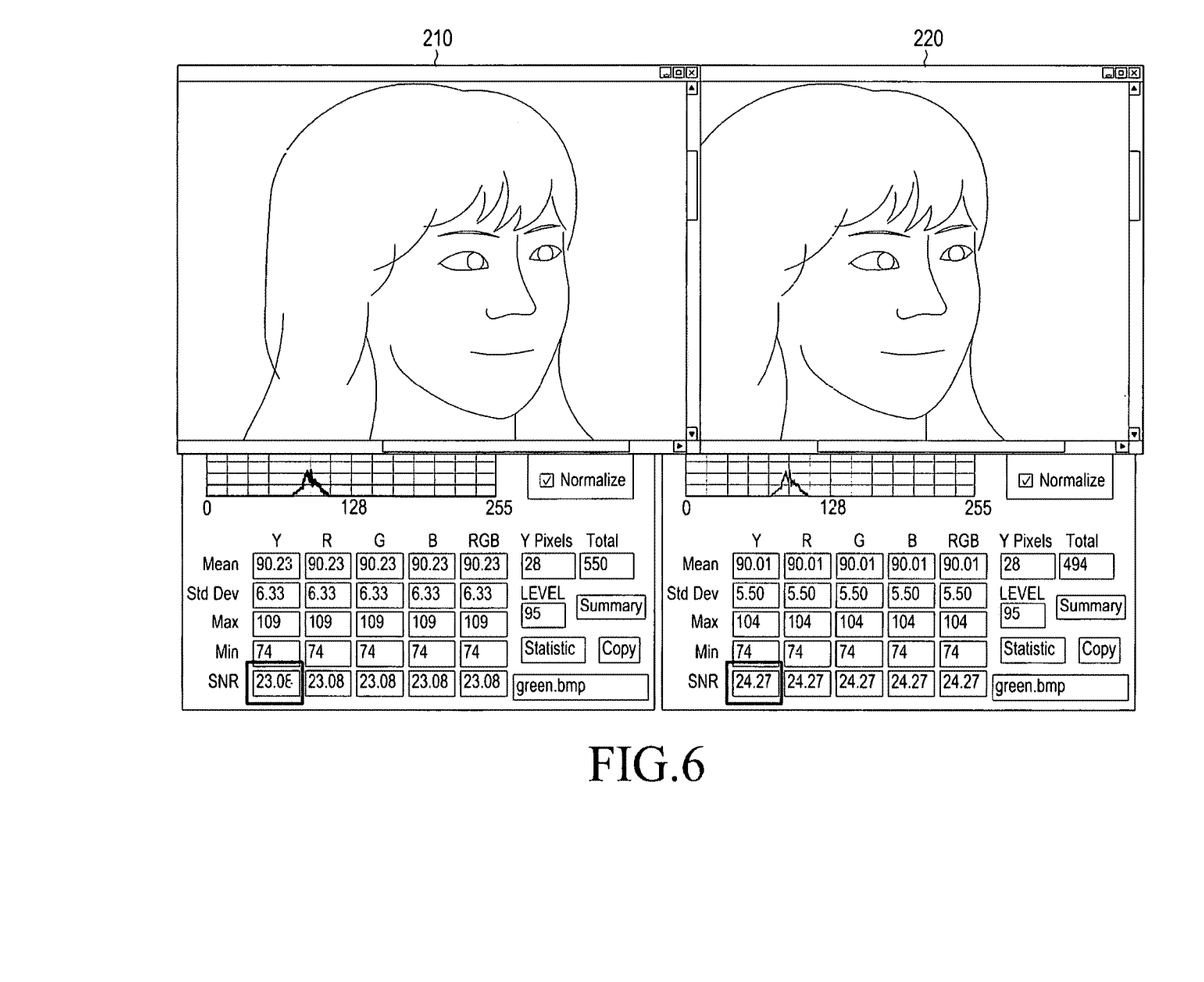
FIG. 6 illustrates vision-recognized images with improved sensitivity according to an embodiment of the present invention.

Because white pixels are superior to green pixels in noise level, using white pixels as vision pixels may improve low-light sensitivity, compared to using green pixels as vision pixels. This comparison is illustrated in FIG. 6, which illustrates a first recognition image 210 in which green pixels are used as vision pixels, and a second recognition image 220 in which white pixels are used as vision pixels.

In the image sensor including pixels of various colors, pixels of a color having higher-sensitivity characteristics are designated as vision pixels, so vision recognition may be performed with single-color recognition image data in an embodiment of the present invention.

Pixels receiving brightness of the R,G and B colors are used, and two pixel values may be used as one pixel value.

FIG. 4 illustrates an image sensor array of the image sensor 30 when white pixels are used as vision pixels, according to an embodiment of the present invention.

Referring to FIG. 4, the image sensor array includes red pixels, green pixels, blue pixels, and white pixels. Output values of the red pixels, green pixels, blue pixels, and white pixels are input to the second digital signal converter 70. Among them, output values of the white pixels are input even to the first digital signal converter 40 via the read-out circuit 110. In FIG. 4, the read-out circuit 110 shown by solid lines is simplified for the sake of conciseness.

The first digital signal converter 40 and the second digital signal converter 70 each convert analog signals received from pixels in the image sensor 30 into digital signals.

The first digital signal converter 40 converts analog signals received from vision pixels into digital signals and outputs them to the first image processor 50 to generate recognition image data. The second digital signal converter 70 converts analog signals received from all pixels in the image sensor 30 into digital signals, and outputs them to the second image processor 80 to generate capturing image data.

The number of output bits of the first digital signal converter 40 is determined to be optimized for vision recognition, and the first digital signal converter 40 is less than the second digital signal converter 70 in terms of the number of output bits, because the number of pixel outputs being input to the first digital signal converter 40 is less than the number of pixel outputs being input to the second digital signal converter 70. Accordingly, the first digital signal converter 40 consumes less power than the second digital signal converter 70.

As for the image sensor 30, image sensors may be classified into a CCD image sensor and a CMOS image sensor according to their type. If the image sensor 30 is a CMOS image sensor, the first digital signal converter 40 and the second digital signal converter 70 may include a Correlated Double Sampling (CDS) unit, as illustrated in FIG. 3.

Figure 3:
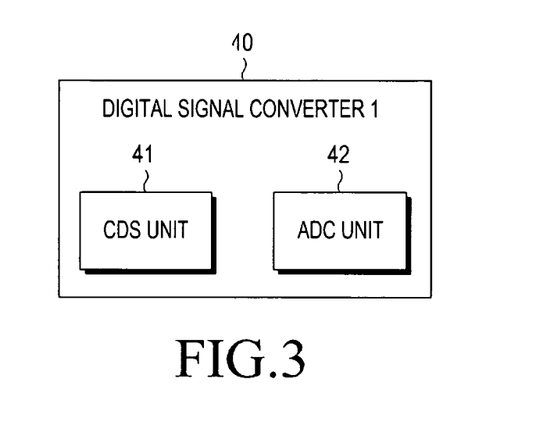
FIG. 3 illustrates a digital signal converter according to an embodiment of the present invention.

FIG. 3 illustrates the first digital signal converter 40 when the image sensor 30 is a CMOS image sensor.

Referring to FIG. 3, the first digital signal converter 40 includes a CDS unit 41 and an Analog to Digital Converter (ADC) unit 42.

If the image sensor 30 is a CMOS image sensor, its image sensor array includes a plurality of pixels that are arranged in the form of a two-dimensional matrix. The plurality of pixels each output a reset signal and a detection signal based on selection signals for selecting the pixels. Accordingly, the CDS unit 41 receives detection signals and reset signals corresponding to the vision pixels, generates analog image signals by CDS-sampling the received signals, and outputs the analog image signals to the ADC unit 42, which converts analog image signals received from the CDS unit 41 into digital image signals, and outputs them to the first image processor 50.

If the image sensor 30 is a CMOS image sensor, the second digital signal converter 70 may also be configured to be similar to the first digital signal converter 40. However, the CDS unit 41 included in the first digital signal converter 40 is configured to sample signals output only from the vision pixels, whereas the CDS unit included in the second digital signal converter 70 may be configured to sample signals output from all the pixels in the image sensor 30.

Accordingly, the CDS unit 41 included in the first digital signal converter 40 consumes less power than the CDS unit included in the second digital signal converter 70.

The first image processor 50 processes digital signals received from the first digital signal converter 40, generates recognition image data in a recognition image format, and outputs the recognition image data to the vision recognition processor 60.

The vision recognition processor 60 performs various vision recognition functions based on the recognition image data. In other words, the vision recognition processor 60 detects and recognizes a specific object or movement of the specific object from the recognition image data, and performs a specific operation depending on the recognition results in cooperation with the controller 90.

The second image processor 80 processes digital signals received from the second digital signal converter 70, generates capturing image data in the capturing image format, and stores the image data in a memory (not shown). For example, the second image processor 80 may generate still image data, preview image data, and video data.

An operation of processing images by the digital device configured as described above according to an embodiment of the present invention will be described with reference to FIG. 5.

Figure 5:
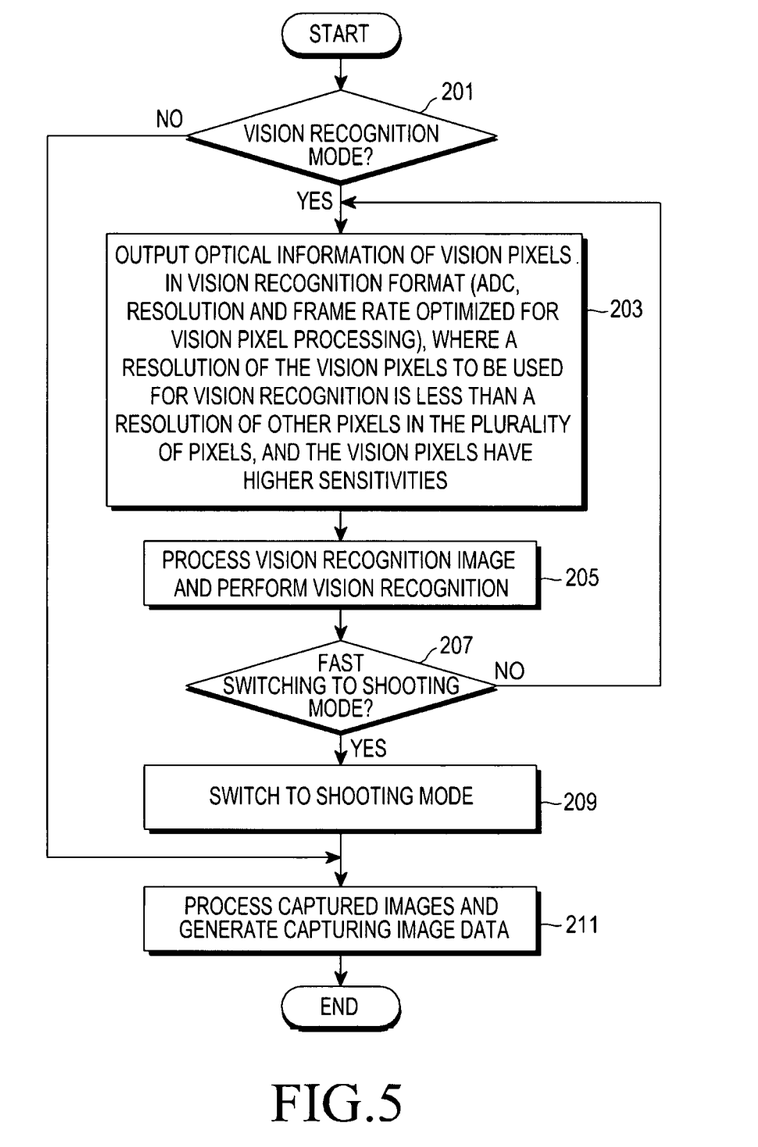
FIG. 5 illustrates an operation of a digital device according to an embodiment of the present invention.

Referring to FIG. 5, the controller 90 of the digital device determines in step 201 whether a vision recognition mode is presently set. If the vision recognition mode is not set, the controller 90 proceeds to step 211, determining that a shooting mode is set, and controls the sensor controller 100 to set operation parameters corresponding to the capturing image format in the image sensor 30, and output optical information from the image sensor 30 so as to match with the capturing image format. The controller 90 generates capturing image data by means of the second digital signal converter 70 and the second image processor 80.

If the vision recognition mode is set in step 201, the controller 90 controls the sensor controller 100 in the vision recognition mode in step 203, to set operation parameters corresponding to the recognition image format in the image sensor 30 and output optical information from vision pixels so as to match the recognition image format. A resolution and a frame rate of recognized images optimized for vision recognition are likely to be less than those of the general captured images. As a result, power consumption of the image sensor 30 in the vision recognition mode will be less than that in the shooing mode.

In step 205, the controller 90 generates recognition image data based on signals output from vision pixels in the image sensor 30 by controlling the first digital signal converter 40 and the first image processor 50, and performs vision recognition based on the recognition image data by controlling the vision recognition processor 60.

Thereafter, the controller 90 determines in step 207 whether an event of fast mode switching from the vision recognition mode to the shooting mode occurs. If there is fast mode switching to the shooting mode in step 207, the controller 90 changes its operation mode to the shooting mode in step 209, and generates capturing image data in step 211.

The term 'fast mode switching' as used herein may refer to a need for fast switching between the vision recognition mode and the shooting mode. The fast mode switching may be achieved when vision recognition results obtained in the vision recognition mode are used in the shooting mode. For example, after performing face recognition in the recognition image data, the digital device may set the shooting focus on the basis of the recognized portion of the face, and generate capturing image data. In this case, the operation mode will fast switch from the shooting mode to the vision recognition mode, and from the vision recognition mode to the shooting mode.

More specifically, before the still image shooting or the video-shooting starts in the shooting mode, the digital device generates preview image data and displays it in the preview mode. Generally, preview images are images received from the image sensor that the digital device will provide to the user, before the still image shooting or the video-shooting starts. The preview images are displayed on the screen, but image data thereof is not stored in a memory of the digital device.

If a face recognition-based auto focusing function is activated, the controller 90 first sets a preview mode of the shooting mode. Then, the sensor controller 100 sets operation parameters corresponding to the preview mode in the image sensor 30, and the second digital signal converter 70 and the second image processor 80 generate preview image data and display it on the screen. These preview images are a type of video, and preview images are provided to the user as frame data is generated at a rate of tens of frames per second and continuously displayed. In an embodiment of the present invention, the frame rate is assumed to be 24 frames per second.

To perform face recognition-based auto focusing, the controller 90 switches its operation mode from the preview mode to the vision recognition mode, generates recognition image data for a period of several frames (e.g., 5 frames), and switches back to the preview mode upon completion of the generation of recognition image data.

Accordingly, in the vision recognition mode, operation parameters corresponding to the recognition image format are set in the image sensor 30 by the sensor controller 100. However, in this embodiment, the vision recognition mode maintains its frame rate at the frame rate of the preview mode. Optical information is transferred to the first digital signal converter 40 by the read-out circuit 110, and recognition image data necessary for face recognition is generated by the first digital signal converter 40 and the first image processor 50. For a period of several frames where recognition image data is generated, frame data of previously generated preview images is repeatedly displayed on the screen, maintaining the display of preview images. Although frame data of previous preview images is displayed without generation of frame data of preview images during generation of five-frame data (e.g., five recognition image data), the user may recognize that the preview images are continuously displayed in real time, because the human eyes cannot easily recognize the interruption.

However, the digital device operates in the vision recognition mode while generating recognition image data, thus contributing to a reduction in power consumption.

Thereafter, the controller 90 switches back to the preview mode and generates preview image data, and the vision recognition processor 60 performs face recognition based on the generated recognition image data.

While face recognition is performed in the vision recognition processor 60, preview images are displayed on the screen, and upon completion of the face recognition, recognition results (e.g., position information for a specific area where the face is recognized in the recognition images) are transferred to the controller 90. The controller 90 transfers the recognition results to the second image processor 80 and the sensor controller 100, allowing the sensor controller 100 to achieve auto focusing on the basis of a specific area, and allowing the second image processor 80 to display an indicator indicating the specific area on the preview images.

Thereafter, if a shooting command such as a shutter key input is input by the user, still image data or video data, which is focused on a specific area, is generated and stored in a memory.

When the operation mode switches rapidly from the vision recognition mode to the shooting mode, optical information of vision pixels used during generation of recognition image data may be used even for generation of capturing image data. If the controller 90 switches the operation mode to an image-capturing mode during operation of the vision recognition mode, pixels that have been used in the vision recognition mode are all changed to pixels for the image-capturing mode. Accordingly, the controller 90 receives optical information of vision pixels used during generation of recognition image data from the first image processor 50, and transfers the optical information to the second image processor 80, and the second image processor 80 uses the received optical information of vision pixels in generating the capturing image data.

When white pixels are used as vision pixels, in order to use the optical information of vision pixels in generating the capturing image data, the second image processor 80 performs pixel interpolation on the optical information of vision pixels received from the controller 90, and uses the pixel-interpolated values in generating the capturing image data. For the pixel interpolation, bilinear image interpolation may be used. In this case, performance of a sensor having a very high sensitivity may be guaranteed.

Figure 7:
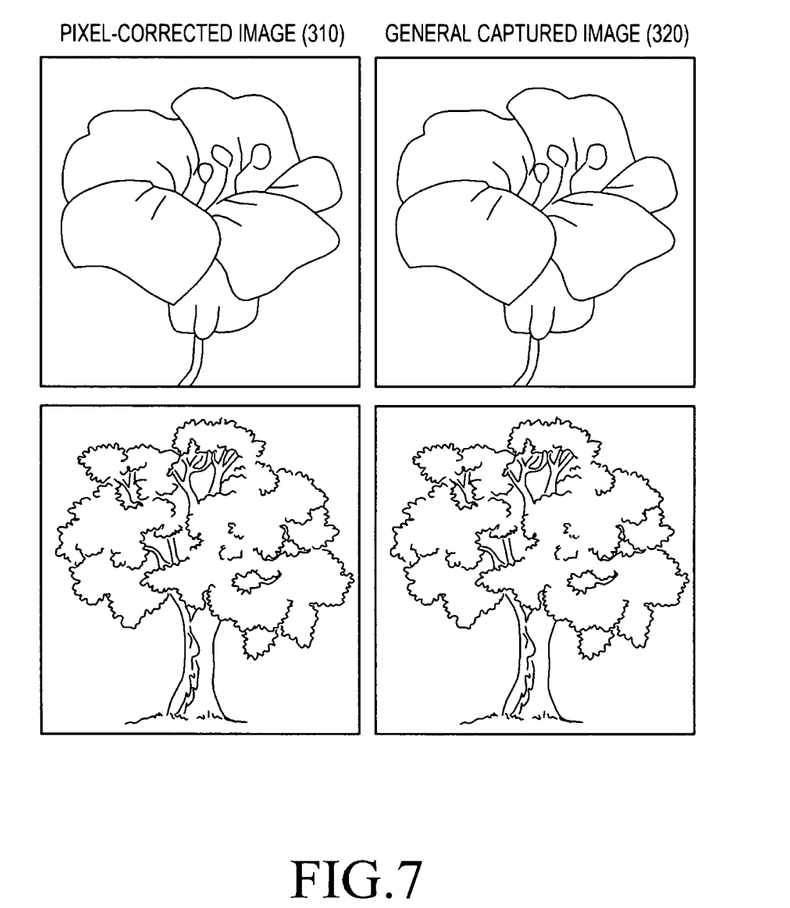
FIG. 7 illustrates captured images according to an embodiment of the present invention.

An example of capturing image data that is generated for the same subject by performing this interpolation is shown in FIG. 7.

In FIG. 7, a first image 310 has undergone pixel correction, and a second image 320 is a general captured image. When the two images 310 and 320 are compared, the difference in image quality may not be identified by the naked eye.

In accordance with another embodiment of the present invention, when the digital device is a smart phone and a finger is set as a recognition object, a process of selecting an icon on the smart phone by vision recognition will be described with reference to FIG. 8. Generally, smart phones may have one high-performance image sensor for image capturing, or smart phones capable video calls may have two image sensors, with one on the front and the other on the back. Theses image sensors are high-performance image sensors because they are basically for image capturing.

Figure 8:
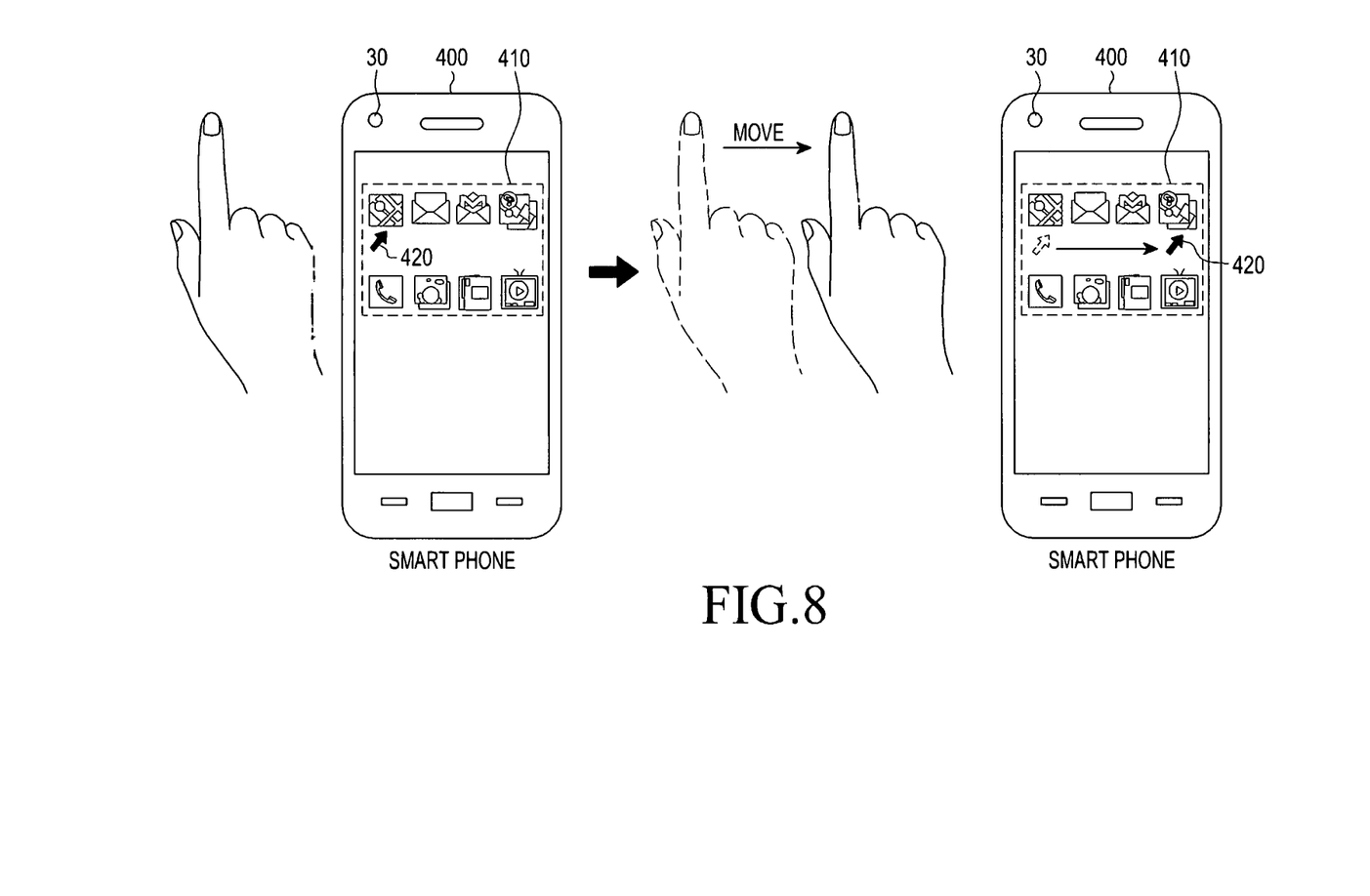
FIG. 8 illustrates a vision recognition process according to an embodiment of the present invention.

FIG. 8 focuses on an image sensor 30 mounted on the front top of a smart phone 400, which is assumed to include all components shown in FIG. 2.

Referring to FIG. 8, upon request of the user, the controller 90 of the smart phone 400 sets a vision recognition mode in which a finger is set as a recognition object. The sensor controller 100 sets operation parameters corresponding to the recognition image format in the image sensor 30. The controller 90 controls the second image processor 80 to display an icon list 410 and a selection indicator 420 on the screen.

Finger images are received through the image sensor 30, and optical information from vision pixels in the image sensor 30 is transferred to the first digital signal converter 40 via the read-out circuit 110. The first image processor 50 generates recognition image data based on digital image signals output from the first digital signal converter 40, and the vision recognition processor 60 recognizes a finger (i.e., a recognition object) in the recognition image data. The vision recognition processor 60 detects a position of the recognition object from the recognition image data, and reflects the position in the selection indicator 420. As the finger moves as shown in FIG. 8, the vision recognition processor 60 detects a motion vector of the recognition object and transfers the motion vector to the controller 90. The controller 90 transfers the detected motion vector to the second image processor 80, to reflect it in the position of the selection indicator 420. The second image processor 80 moves the displayed selection indicator 420.

In this manner, in the vision recognition mode, the read-out circuit 110, the first digital signal converter 40 and the first image processor 50 operate to process optical information collected only by the vision pixels in the image sensor 30, for vision recognition, contributing to a reduction in power consumption of the smart phone 400.

As described above, the present invention designates some of pixels in a general image sensor for image capturing as vision pixels used for vision recognition, uses optical information obtained only from the vision pixels in performing vision recognition in the vision recognition mode, and generates capturing image data based on optical information obtained from all the pixels in the image data in the image-shooting mode.

In addition to a digital signal converter that converts optical information of all pixels in the image sensor into a digital signal, the present invention separately provides a digital signal converter that converts optical information obtained only from vision pixels into a digital signal. The present invention may separately provide an image processor for processing signals output from the digital signal converter for vision recognition and an image processor for processing signals output from the digital converter for image capturing.

The number of output bits of the digital signal converter for vision recognition, and a resolution of and the number of frames of image data for vision recognition are determined to be optimized for vision recognition, enabling a rapid performance of vision recognition with low power consumption, compared to processing image data for image capturing. The vision pixels, the digital signal converter for vision recognition, and the image processor for vision recognition may be designed to have efficient power consumption, which is about ⅒ to ¹⁄₁₀₀ of that in the shooting mode.

According to an embodiment of the present invention, using a digital camera embedded in or externally connected to digital devices capable of information input/output such as mobile phones, handheld televisions, portable personal computers, notebook computers, digital audio players and PMPs, a digital device may extract vision recognition information from images captured by the digital camera, and perform functions such as information inputting and situation recognition between its user and the digital device based on the extracted information. In particular, the present invention provides an image sensor that is optimized for vision recognition and enables normal image capturing, enabling a rapid performance of vision recognition with low power consumption.

While the invention has been shown and described with reference to embodiments thereof, it will be understood by those skilled in the art that various changes in form and details may be made therein without departing from the spirit and scope of the invention as defined by the appended claims and their equivalents.

For example, the first image processor 50 and the second image processor 80 may be configured as a single integrated image processor. In this case, the integrated image processor, under control of the controller 90, may operate in the manner of the first image processor 50 in the vision recognition mode, and operate in the manner of the second image processor 80 in the shooing mode. The integrated image processor may output recognition image data to the vision recognition processor 60, and store capturing image data in the memory.

In an alternative embodiment of the present invention, the first image processor 50 and the second image processor 80 may be configured to be included in a single image-processing module, which may be configured to allow the related image processor 50 (or 80) included therein to operate, depending on the operation mode.

What is claimed is:

1. A vision recognition apparatus in a digital device, comprising:
   an image sensor including a plurality of pixels, a portion of the plurality of pixels being designated as vision pixels to be used for vision recognition;
   a first digital signal converter configured to digitally convert a signal output from the designated vision pixels;
   a second digital signal converter configured to digitally convert a signal output from the plurality of pixels; and
   a processor configured to:
   generate recognition image data to be used for vision recognition by using optical information obtained from the designated vision pixels by processing signals output from the first digital signal converter in a vision recognition mode,
   perform vision recognition by identifying and detecting a specific object included in the generated recognition image data, and
   generate capturing image data by processing signals output from the second digital signal converter in a shooting mode,
   wherein a number of the vision pixels to be used for vision recognition is determined depending on a resolution of the recognition image data,
   wherein a resolution of the vision pixels to be used for vision recognition is less than a resolution of other pixels in the plurality of pixels,
   wherein the vision pixels have higher sensitivities among the plurality of pixels having different sensitivities, the vision pixels including white pixels, and
   wherein the capturing image data is generated based on results obtained by performing pixel interpolation on optical information of the vision pixels.

2. The vision recognition apparatus of claim 1, wherein the image sensor is a Complementary Metal-Oxide Semiconductor (CMOS) image sensor; and
   wherein the first digital signal converter includes:
   a Correlated Double Sampling (CDS) unit configured to receive signals from the vision pixels; and
   an Analog to Digital Converter (ADC) unit configured to digitally convert signals output from the CDS unit.

3. The vision recognition apparatus of claim 1, wherein a number of output bits of the first digital signal converter is determined based on the number of vision pixels, a size of the recognition image data, and a resolution of the recognition image data.

4. The vision recognition apparatus of claim 1, wherein the plurality of pixels include a plurality of red pixels, a plurality of blue pixels, and a plurality of green pixels, and at least two of the green pixels are designated as the vision pixels.

5. The vision recognition apparatus of claim 1, wherein the integrated image processor includes:
   a first image processor configured to generate the recognition image data by processing signals output from the first digital signal converter in the vision recognition mode; and
   a second image processor configured to generate the capturing image data by processing signals output from the second digital signal converter in the shooting mode.

6. The vision recognition apparatus of claim 1, further comprising a read-out circuit configured to output optical information of the vision pixels to the first digital signal converter.

7. A vision recognition method in a digital device with an image sensor including a plurality of pixels, the method comprising:
  determining whether an operation mode is a vision recognition mode;
  generating, if the operation mode is a vision recognition mode, recognition image data to be used for vision recognition by using optical information obtained from vision pixels by processing signals output from a first digital signal converter that digitally converts a signal output from a portion of the plurality of pixels being designated as the vision pixels to be used for vision recognition in the image sensor;
  performing vision recognition by identifying and detecting a specific object included in the generated recognition image data; and
  generating, if the operation mode is a shooting mode, capturing image data by processing signals output from pixels selected from among the plurality of pixels depending on a specific resolution, by a second digital signal converter that digitally converts a signal output from each of the plurality of pixels,
  wherein a number of the vision pixels to be used for vision recognition is determined depending on a resolution of the recognition image data,
  wherein a resolution of the vision pixels to be used for vision recognition is less than a resolution of other pixels in the plurality of pixels,
  wherein the vision pixels have higher sensitivities among the plurality of pixels having different sensitivities, the vision pixels including white pixels, and
  wherein the capturing image data is generated based on results obtained by performing pixel interpolation on optical information of the vision pixels.

8. The vision recognition method of claim 7, wherein a number of output bits of the first digital signal converter is determined based on the number of vision pixels, a size of the recognition image data, and a resolution of the recognition image data.

9. The vision recognition method of claim 7, wherein the plurality of pixels include a plurality of red pixels, a plurality of blue pixels, and a plurality of green pixels, and some of the green pixels are designated as the vision pixels.

10. The vision recognition method of claim 7, wherein the recognition image data is generated in the vision recognition mode by a first image processor that processes signals output from the first digital signal converter, and the capturing image data is generated in the shooting mode by a second image processor that processes signals output from the second digital signal converter.

11. A low-power vision recognition method in a mobile terminal with an image sensor including a plurality of pixels, the method comprising:
  receiving an image from the image sensor;
  extracting a recognition image input to a portion of the plurality of pixels being designated as vision pixels to be used for vision recognition in the image sensor; and
  performing vision recognition by identifying and detecting a specific object included in the recognition image input to the vision pixels,
  wherein the extracting comprises generating, if an operation mode of the mobile terminal is a vision recognition mode, recognition image data to be used for vision recognition by using optical information obtained from the designated vision pixels by digitally converting a signal output from the portion of the plurality of pixels, and
  wherein a number of the vision pixels to be used for vision recognition is determined depending on a resolution of the recognition image data,
  wherein a resolution of the vision pixels to be used for vision recognition is less than a resolution of other pixels in the plurality of pixels,
  wherein the vision pixels have higher sensitivities among the plurality of pixels having different sensitivities, the vision pixels including white pixels, and
  wherein the capturing image data is generated based on results obtained by performing pixel interpolation on optical information of the vision pixels.

12. The low-power vision recognition method of claim 11, wherein the extracting a recognition image includes generating recognition image data by processing signals output from a first digital signal converter that digitally converts a signal output from each of the vision pixels.

13. The low-power vision recognition method of claim 12, wherein a number of output bits of the first digital signal converter is determined based on the number of vision pixels, a size of the recognition image data, and a resolution of the recognition image data.

14. The low-power vision recognition method of claim 11, further comprising generating, if a shooting mode is set, capturing image data by processing signals output from pixels selected from among the plurality of pixels depending on a specific resolution, by a second digital signal converter that digitally converts a signal output from each of the plurality of pixels.

15. The low-power vision recognition method of claim 11, wherein all of the plurality of pixels include a plurality of red pixels, a plurality of blue pixels, and a plurality of green pixels, and some of the green pixels are designated as the vision pixels.

* * * * *